(12) United States Patent
Navarro Ruiz et al.

(10) Patent No.: US 8,450,968 B2
(45) Date of Patent: May 28, 2013

(54) AUTOMATIC PARKING SYSTEM FOR ELECTRIC AND NORMAL BICYCLES, WITH BATTERY RECHARGE, ANTI-THEFT BLOCKING AND MONITORING OF BICYCLE USE

(75) Inventors: Bartolomé Navarro Ruiz, Pozuelo de Alarcón-Madrid (ES); Pedro Pérez De Ayala, Pozuelo de Alarcón-Madrid (ES); Pablo Rosa Casado, Pozuelo de Alarcón-Madrid (ES)

(73) Assignee: Geofoton Soluciones Sostenibles, SL, Madrid (ES)

( * ) Notice: Subject to any disclaimer, the term of this patent is extended or adjusted under 35 U.S.C. 154(b) by 824 days.

(21) Appl. No.: 12/566,145

(22) Filed: Sep. 24, 2009

(65) Prior Publication Data
US 2010/0089846 A1 Apr. 15, 2010

(30) Foreign Application Priority Data
Sep. 24, 2008 (ES) .................................. 200802716

(51) Int. Cl.
*H01M 10/44* (2006.01)
*H01M 10/46* (2006.01)
(52) U.S. Cl.
USPC .......................................................... 320/109
(58) Field of Classification Search
USPC ................... 320/107, 109, 114, 115
See application file for complete search history.

(56) References Cited

U.S. PATENT DOCUMENTS
2010/0228405 A1* 9/2010 Morgal et al. .................. 320/107

FOREIGN PATENT DOCUMENTS
| | | |
|---|---|---|
| CN | 201227988 Y | 4/2009 |
| DE | 202007012506 U1 | 6/2007 |
| EP | 0902523 A1 | 3/1999 |
| JP | 2003079006 A | 3/2003 |
| JP | 2003118671 A | 4/2003 |
| JP | 2006185425 A | 7/2006 |
| WO | 9809254 A2 | 3/1998 |

\* cited by examiner

*Primary Examiner* — Edward Tso
(74) *Attorney, Agent, or Firm* — Tristan A. Fuierer; Andrew D. Gerschutz; Moore & Van Allen, PLLC

(57) ABSTRACT

The system is universal and is designed to carry out the functions of supporting the vehicle, blocking against theft, recharging the battery, measuring the level of charge and transmitting control, use and other data, all automatically once the vehicle is in its resting position. The parking system comprises two ports: the "vehicle port" (1) and the "station port" (5). The "vehicle port (1)" comprises two identical parts to be installed on each side of one of the wheels of the vehicle, the vehicle being a bicycle or a motorcycle. The "vehicle port" (1) is fitted to the shaft (2) of the wheel (4) by means of a threaded hole (15). This shaft (2) passes through the bushing of the wheel (3) leaving the bicycle fork (13) in the middle. This shaft (2), may belong to the bushing (3) of the wheel (4), or be introduced separately. The "vehicle port" (1) is electrically connected to the bicycle battery or control box by means of two wires (11) to enable recharging.

12 Claims, 6 Drawing Sheets

AUTOMATIC PARKING SYSTEM FOR ELECTRIC AND NORMAL BICYCLES, WITH BATTERY RECHARGE, ANTI-THEFT BLOCKING AND MONITORING OF BICYCLE USE

CROSS-REFERENCE TO RELATED APPLICATIONS

This application claims priority to Spanish Patent Application No. P200802716.3, filed Sep. 24, 2009 and entitled "Automatic Parking System for Electric and Normal Bicycles with Battery Recharge, Anti-Theft Blocking and Monitoring of Bicycle Use" in the name of Bartolomé NAVARRO RUIZ et al., which is incorporated by reference herein in its entirety.

DESCRIPTION

1. Field of the Technique

The invention relates to the transport sector and more specifically to the sector of electric vehicles and sustainable mobility.

2. State of the Art

This innovation relates to a bicycle-parking system with anti-theft blocking, automatic battery recharging, and data communication which, moreover, is universal.

Mobility in cities, the limitation and rising prices of petroleum-derived fuels and the deterioration of the environment are encouraging society to change habits. As a reflection of this, in recent years there has been enormous growth in the number of journeys carried out using means of transport that are "gentle" with the environment, in particular, bicycles and electric vehicles.

Within the transport sector, the case of bicycles, and more specifically electric bicycles, presents various particular features that need taking into account, in other words, vulnerability to theft, need for a support in order to park, low cost of purchase and use, etc. Therefore, it would be sensible to have an easy-to-install standardised system that any type of bicycle could use, providing a support for parking, an anti-theft lock and, additionally, fulfilling the functions of recharging the battery and communicating data, without representing a disproportionate cost to that of the vehicle itself.

This invention offers a simple standard solution for this, given that it can be easily installed without requiring modifications to the vehicle, and it is also universal, since it is designed for bicycles of any type and size.

This simple design however fulfils a variety of functions, i.e. supporting the vehicle for parking, blocking against theft, an electrical contact for recharging the battery and communicating data in order to monitor and control use and permits.

SUMMARY OF THE INVENTION

The aims of the invention are achieved by means of a "vehicle port" according to claim 1, a "station port" according to claim 3, a universal automatic parking system according to claim 4, a procedure for mounting a vehicle port according to claim 7, and a procedure for securing a vehicle according to claim 8. Particular and advantageous embodiments of the invention are defined in the dependent claims.

More specifically, the present invention refers to a universal automatic parking system for any model of bicycle whether conventional or electric, designed to encourage urban mobility using bicycles and designed to carry out the functions of supporting the vehicle, blocking the vehicle against theft, recharging the battery, and transmitting data regarding control and use, charge measurements, fault detection and more.

The universal automatic parking system comprises two ports, the "station port" and the "vehicle port".

The idea for the invention came about because electric bicycles need to be recharged, as well as parked and blocked. Given the growth in plans for sustainable urban mobility and the promotion of the bicycle as a solution for mass travel in cities, the need arises for a system that combines the functions of protection against theft, ease of parking, automatic recharging and monitoring of use, i.e., making sure that replacing the personal car for the bicycle does not represent new obstacles or efforts for the user. In addition to this, the invention allows the user to know his user and incident profile, to know in advance the level of charge of the battery and a variety of other functions that may be added to these.

The system facilitates use of the bicycle to a considerable extent since it is supported in its parking place, blocked and charged in one simple push. Therefore, the classical anti-theft chain is not necessary, we avoid having to look for a parking place that is often unsuitable, and we do not need to worry about having to connect the battery charger using a wire and having to look for a power socket, making it fast, convenient and safe.

Despite the fact that the invention is described in the area of parking bicycles, it can also be adapted to parking motorcycles, or similar vehicles, by reinforcing the supports of both the vehicle port and the station port in order to sustain the increased weight of a motorcycle in respect of a bicycle.

Thus, a first inventive aspect is a "vehicle port" that is mounted on the shaft of the front wheel or back wheel, which means that it can be mounted on any bicycle without any need to modify or adapt it, or in any case, requiring only minor modifications. Assembly is carried out by removing the original system for fastening the wheel on and then screwing on the two end terminals. When the shaft of the front wheel does not have the threaded zone at the end required for screwing on the two end terminals, the original system for fastening the wheel on is removed and a threaded bar is inserted through the wheel bushing.

A second inventive aspect is presented by a "station port" fixed to the ground that comprises two symmetrical blocks situated in parallel leaving space for a vehicle wheel between them, each block provided with a pre-positioning point in the form of a guide rail for the vehicle port to a resting point, said resting point being provided with a terminal for making electrical contact with the vehicle port and transmitting data; and a motorised blocking mechanism to prevent robbery when the vehicle is parked, the resting point being preceded by a groove to guide the vehicle port to said resting point, the groove moreover protecting the terminal and the blocking mechanism from the elements and preventing access for a person's hand.

A third inventive aspect is a system comprising a vehicle port according to the first inventive aspect and a station port according to the second inventive aspect.

A fourth inventive aspect is a procedure for mounting a vehicle port according to the first inventive aspect on a vehicle.

A fifth inventive aspect is a procedure for supporting the vehicle using the system of the third inventive aspect.

DESCRIPTION OF THE DRAWINGS

In order to complement the description being made and contribute to a better understanding of the characteristics of the invention, according to a preferred practical embodiment thereof, a set of drawings is enclosed as an integral part of said description wherein, by way of illustration but not limitation, the following is represented.

EXAMPLE OF EMBODIMENT

Figure 1:
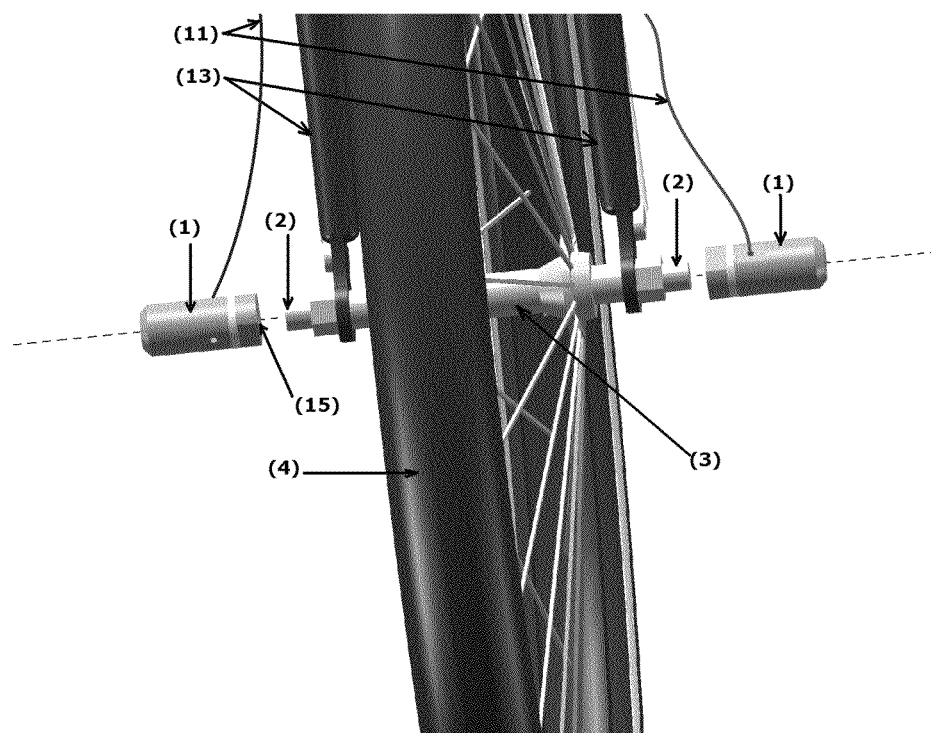
FIG. 1. Shows a representation of the vehicle port of the invention.
Figure 2:
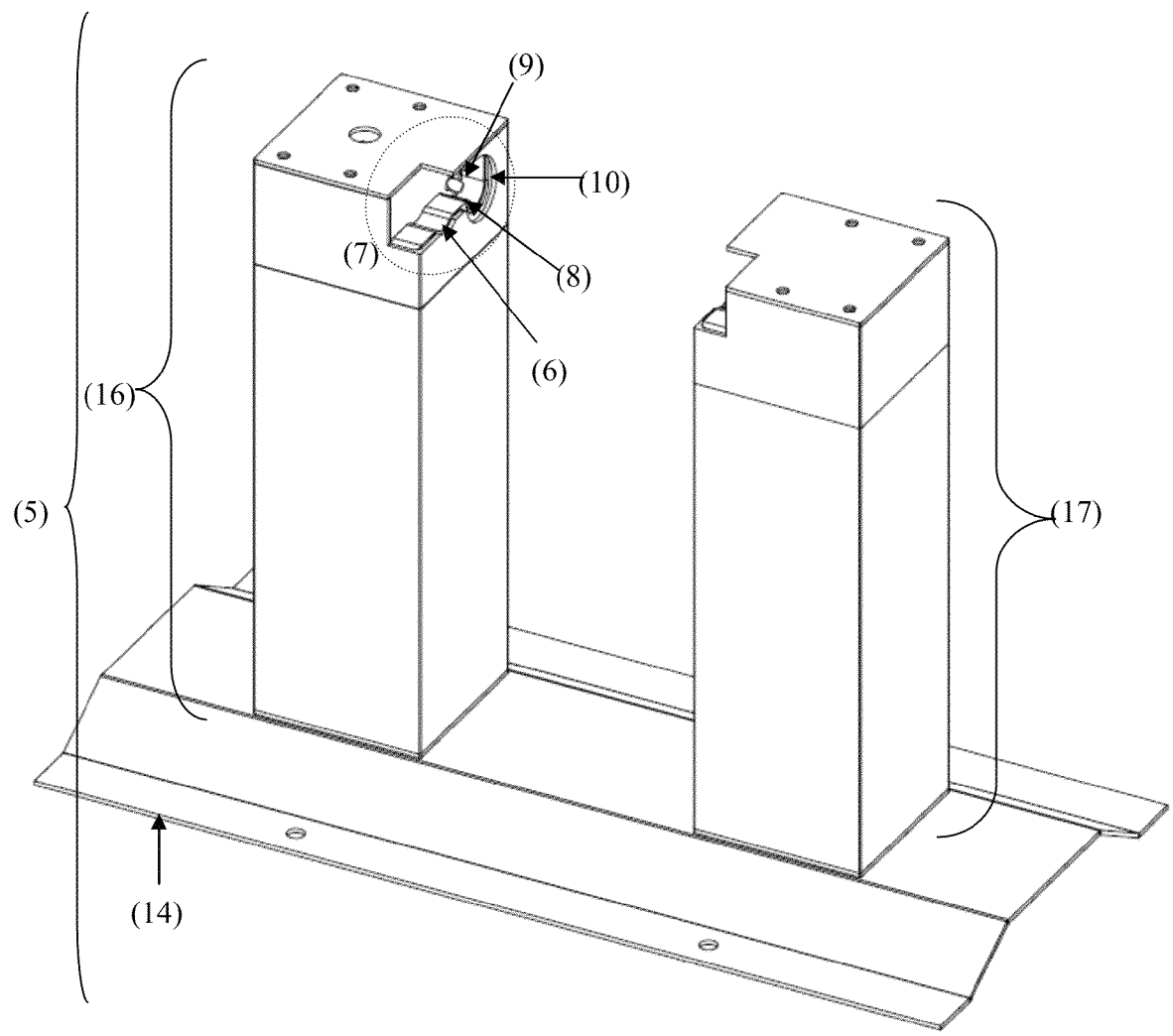
FIG. 2. Shows a representation of the station port of the invention.
Figure 3:
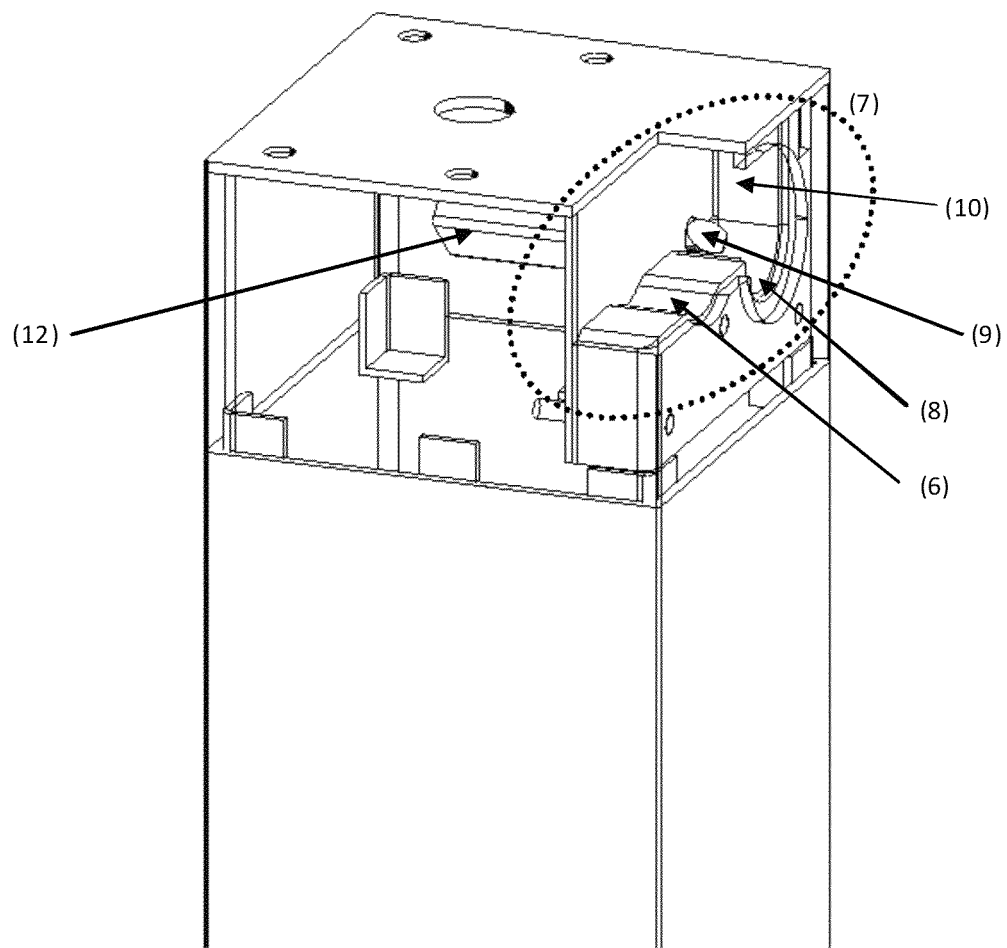
FIG. 3. Shows a close-up of the upper end of one of the blocks of the station port of the invention.
Figure 4:
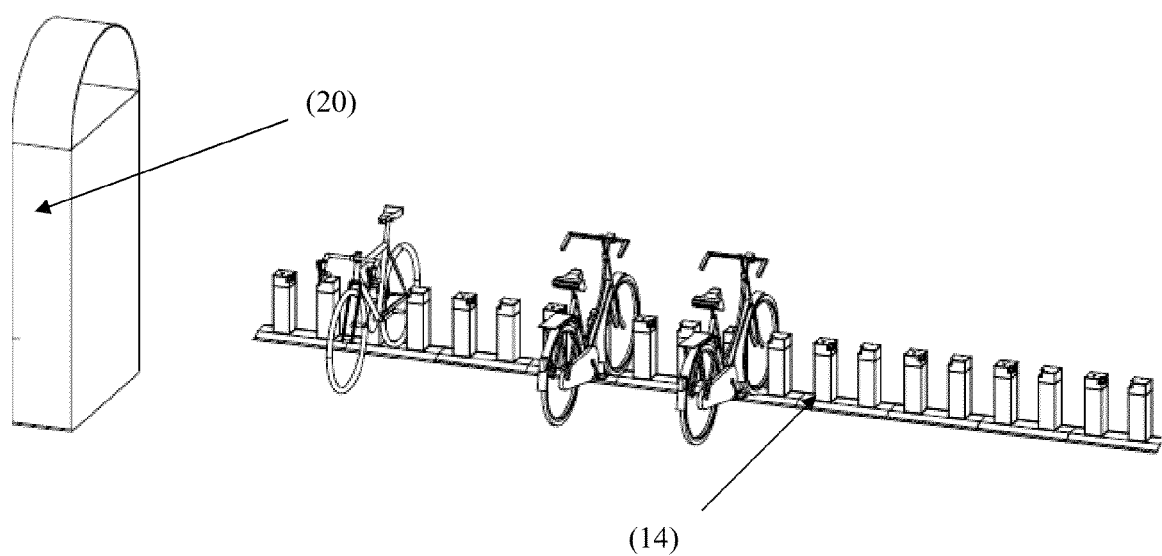
FIG. 4. Shows a representation of the bicycle support of the system of the invention.
Figure 5:
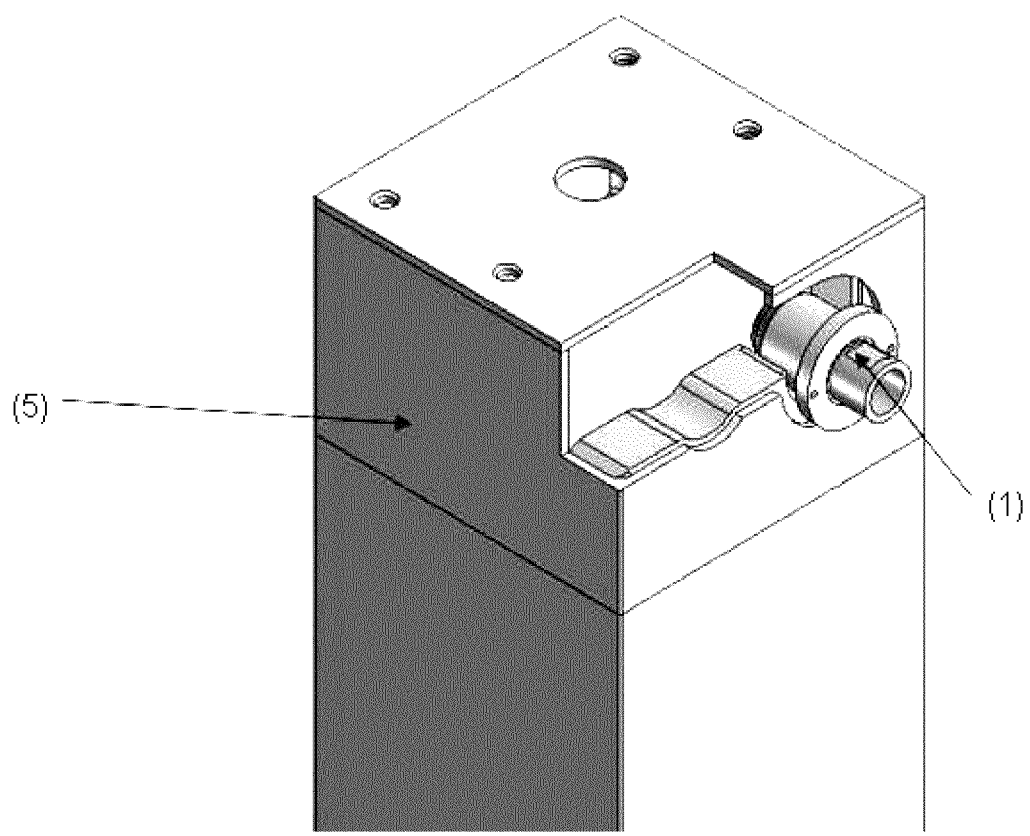
FIG. 5. Shows a representation of the vehicle port in its resting position in the station port.
Figure 6:
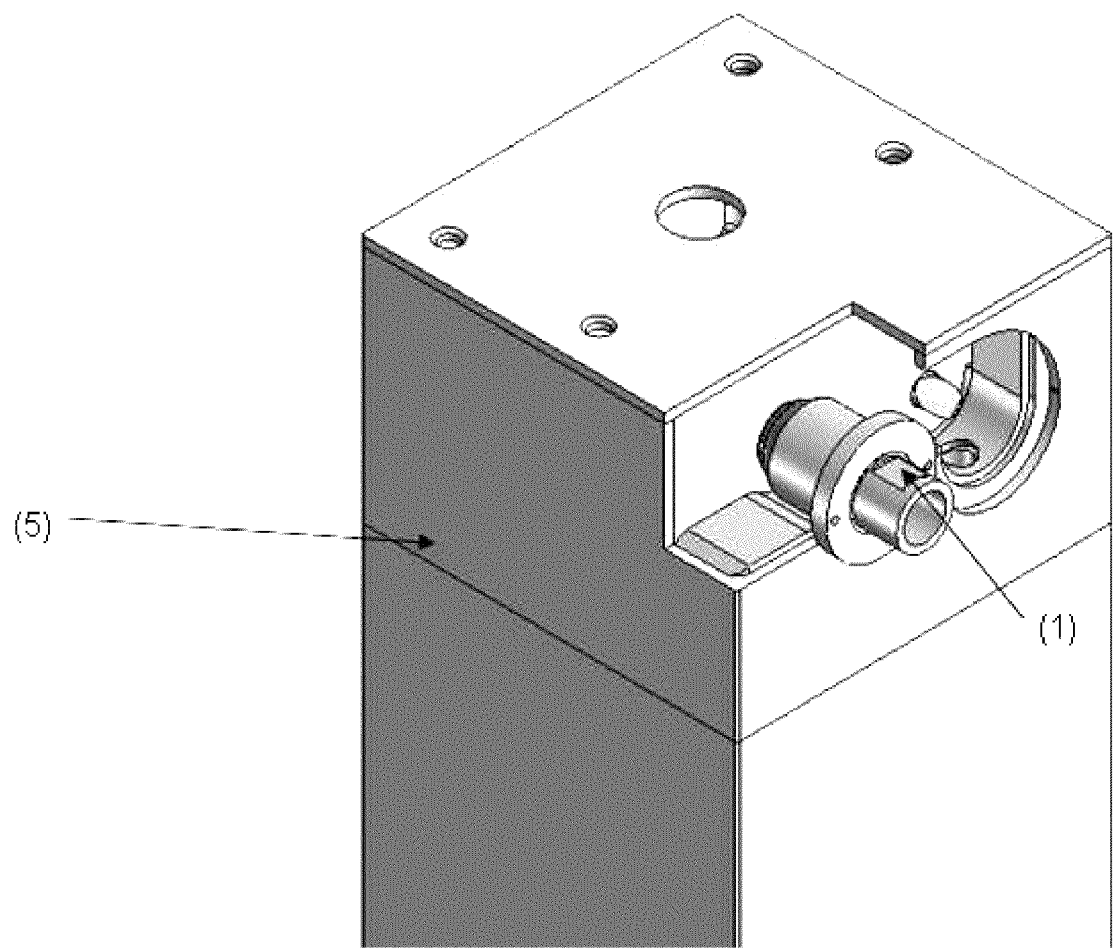
FIG. 6. Shows a representation of the vehicle port in the pre-positioning point of the station port.

The parking system comprises two ports: the "vehicle port" (1) and the "station port" (5). The "vehicle port (1)" comprises two identical parts to be installed on either side of the wheel of the vehicle, the vehicle being a bicycle or a motorcycle. The "vehicle port" (1) is fitted to the shaft (2) of the wheel (4) through a threaded hole (15) contemplated inside the "vehicle port" (1). This shaft (2) passes through the wheel bushing (3) thereby leaving the bicycle fork (13) in the middle. This shaft (2), may belong to the bushing (3) of the wheel (4), or be introduced separately. The "vehicle port" (1) will be electrically connected to the bicycle battery or control box by means of two wires (11) to enable recharging.

The "station port" (5) comprises two symmetrical blocks (16 and 17) that are fixed to the parking area by conventional means, such as the base (14) represented in the drawings. These two blocks (16 and 17) are arranged in parallel in such a way that sufficient space is left between them to introduce the wheel (4) of the bicycle together with the vehicle port (1). Each block (16 and 17) has a pre-positioning point (6), designed to facilitate the manoeuvre of inserting the bicycle. In a variant embodiment, the "station port" (5) has a rising ramp, to facilitate also the manoeuvre of inserting the bicycle and to allow use of wheels of any commercial size.

The "vehicle port" (1) slides along said pre-positioning points (6) of both blocks (16 and 17) supported by grooves (7) contemplated for this purpose, and, with the help of a gentle push by the user, the "vehicle port" (5) reaches the resting zone (8). In this resting zone (8) each block (16 and 17) has a blocking mechanism (9) activated by an electro-mechanical actuator (12) which safeguards the vehicle against robbery. Also, a conductor terminal (10) is in place through which electrical power will be transferred to the vehicle. This terminal (10) is also used for the transmission of data from the bicycle to the "station port" (5), for use in monitoring, control systems, etc. In a variant embodiment, the protocol used for the data transmission is a series protocol. Also there is an electrical cabinet (20) for containing battery chargers and other devices (communication, etc.).

The vehicle port (1) is mounted easily and rapidly, by removing the fastening system of the wheel (4), and threading the vehicle port (1) onto the shaft (2) that passes through the bushing (3) of the wheel (4). Once the vehicle port (1) is mounted on a wheel (4) of the vehicle, the procedure to support the vehicle comprises supporting the terminals of the vehicle port (1) on the blocks (16, 17) of the station port (5), with the wheel (4) fitted with the vehicle port (1) positioned between said blocks (16, 17) and introducing the vehicle port (1) into the grooves (7) until it reaches the resting point (8).

In a variant embodiment, the vehicle port (1) comprises a unique identifying chip, so that the vehicle can be univocally read and recognised, making it possible to monitor the parking system and the bicycles for the various users and system manager with the data regarding use as well as faults allowing use or not depending on the user, the possibility of billing per kilometer traveled, etc.

As mentioned, the electrical connection that allows the bicycle battery to be recharged is established by means of the contact between the vehicle port (1) and the terminal (10) of the station port (5). Both the vehicle port (1) and the station port (5), are provided with respective positive poles on one side of the shaft (3) and negative poles on the other, the station port (5) being connected to the battery charger through a first wire in the first block (16) and a second wire in the second block (17), one of said wires being the positive conductor and the other the negative.

Industrialisation of the present invention is justified by the great potential for use by users who already have a bicycle (electrical or not) as well as those who wish to purchase this system in order to guarantee safety and recharging during parking time, as well as by citizens who decide to join this new concept of mobility when they see how their local authority is promoting it.

It has been considered to implement the invention in two parallel ways. On the one hand it is a question of offering town halls, collectives and companies to install universal parking stations for bicycles (equipped with the "station port"), thus allowing them to have an efficient solution that complements their mobility and sustainable transport plans by reducing the environmental impact.

At the same time, by offering users funding schemes to buy electric bicycles through banks or company incentives for their employees. This will offer citizens beneficial conditions for acquiring their bicycles provided with the "vehicle port", and at the same time they will have the peace of mind of being able to use the parking stations installed by their local authority or company, with the anti-theft device and guaranteed recharge.

Plus, this invention is capable of serving as the basis for public bicycle lending as already exists in many Spanish and European cities.

The invention claimed is:

1. A vehicle port (1) adapted for installation on a shaft (2) of a bushing (3) of a wheel (4) of a vehicle, the vehicle being a bicycle or a motorcycle, the vehicle port (1) comprising two terminal ends provided with respective threaded holes (15), suitable for screwing onto the shaft (2), and two wires suitable for electrically connecting the vehicle port (1) to a battery or to a control box of the vehicle.

2. The vehicle port (1) according to claim 1 that comprises a unique identifying chip for univocal reading and recognition of the vehicle.

3. A station port (5) adapted to receive the vehicle port (1) according to claim 1, wherein the station port (5) comprises
two symmetrical blocks (16, 17) situated in parallel and leaving space between them for receiving the wheel (4) of the vehicle, each block (16, 17) being equipped with a pre-positioning point (6) as a guide rail to guide the vehicle port (1) to a resting zone (8), said resting zone (8) comprising a terminal (10) for making electrical contact and transferring data from the vehicle port (1), and
a motorised blocking mechanism (9) to prevent robbery when the vehicle is parked,
said resting zone (8) being preceded by a groove (7) to guide the vehicle port towards said resting zone (8), protecting said groove (7) as well as the terminal (10)

and the blocking mechanism (9) from the elements and preventing said groove (7) from being accessible for a person's hand.

4. A universal automatic parking system for a bicycle or a motorcycle, which comprises:
 (a) a vehicle port (1) adapted for installation on a shaft (2) of a bushing (3) of a wheel (4) of a vehicle, the vehicle being a bicycle or a motorcycle, the vehicle port (1) comprising two terminal ends provided with respective threaded holes (15), suitable for screwing onto the shaft (2), and two wires suitable for electrically connecting the vehicle port (1) to a battery or to a control box of the vehicle; and
 (b) a station port (5) comprising two symmetrical blocks (16, 17) situated in parallel and leaving space between them for receiving the wheel (4) of the vehicle, each block (16, 17) being equipped with a pre-positioning point (6) as a guide rail to guide the vehicle port (1) to a resting zone (8), said resting zone (8) comprising a terminal (10) for making electrical contact and transferring data from the vehicle port (1), and a motorised blocking mechanism (9) to prevent robbery when the vehicle is parked, said resting zone (8) being preceded by a groove (7) to guide the vehicle port towards said resting zone (8), protecting said groove (7) as well as the terminal (10) and the blocking mechanism (9) from the elements and preventing said groove (7) from being accessible for a person's hand.

5. The universal automatic parking system according to claim 4 wherein a electrical connection that allows the battery to be recharged is established by means of contact of the vehicle port (1) with the terminal (10) of the station port (5), the vehicle port (1) and the station port (5) being provided with respective positive poles on one side of the shaft (2) and respective negative poles on the other side of the shaft (2) and wherein the station port (5) is connected to the battery by means of a first wire in the first block (16) and a second wire in the second block (17), one of said wires being a positive conductor and the other a negative conductor.

6. The universal automatic parking system according to claim 5 wherein communication of data is carried out through the same an electrical contact of the vehicle port (1) with the terminal (10) used for recharging of the battery, and with help of an electronic system.

7. A method for mounting the vehicle port (1) according to claim 1, which comprises removing a fastening system of the wheel (4), and screwing the vehicle port (1) using the threaded hole (15) onto the shaft (2) of the bushing (3) said shaft (2) belonging or not to the bushing (3).

8. The universal automatic parking system of claim 4, wherein the vehicle port comprises a unique identifying chip for univocal reading and recognition of the vehicle.

9. A method for supporting a vehicle, the vehicle being a bicycle or a motorcycle, said method comprising mounting a vehicle port (1) onto a wheel of the vehicle, supporting a terminal (10) of the vehicle port (1) on two symmetrical blocks (16, 17) of a station port (5), using the wheel provided with the vehicle port (1) placed between said blocks (16, 17), and introducing the vehicle port in a groove (7) until reaching a resting point (8).

10. The method for supporting a vehicle according to claim 9, wherein the vehicle port (1) comprises a unique identifying chip for univocal reading and recognition of the vehicle.

11. The method for supporting a vehicle according to claim 10, which comprises monitoring a parking system and bicycles for different users and for a manager of a system and/or communicating data regarding use as well as incidents and allowing or not the vehicle's use depending on the user and/or billing per traveled kilometer.

12. The method of claim 9, wherein the vehicle port (1) is adapted for installation on a shaft (2) of a bushing (3) of the wheel (4) of the vehicle, the vehicle being a bicycle or a motorcycle, the vehicle port (1) comprising two terminal ends provided with respective threaded holes (15), suitable for screwing onto the shaft (2), and two wires suitable for electrically connecting the vehicle port (1) to a battery or to a control box of the vehicle.

* * * * *